(12) United States Patent
Asukabe et al.

(10) Patent No.: US 6,335,112 B1
(45) Date of Patent: Jan. 1, 2002

(54) SOLID POLYMER ELECTROLYTE FUEL CELL

(75) Inventors: Michio Asukabe, Chiryu; Gang Xie, Toyota, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/409,337

(22) Filed: Sep. 30, 1999

(30) Foreign Application Priority Data

Sep. 30, 1998 (JP) .......................................... 10-278397

(51) Int. Cl.⁷ ................................................ H01M 8/10
(52) U.S. Cl. ....................................................... 429/30
(58) Field of Search .............................. 429/12, 15, 29, 429/30, 33, 40

(56) References Cited

U.S. PATENT DOCUMENTS

| | | | |
|---|---|---|---|
| 5,178,971 A | * | 1/1993 | Itoh et al. ...................... 429/40 |
| 5,248,566 A | * | 9/1993 | Kumar et al. .................. 429/19 |
| 5,512,263 A | * | 4/1996 | McIntyre ...................... 429/584 |
| 5,817,718 A | | 10/1998 | Nezu et al. |
| 5,994,426 A | * | 11/1999 | Nezu et al. .................. 522/125 |
| 6,068,943 A | * | 5/2000 | Divisek et al. ................ 429/17 |
| 6,171,721 B1 | * | 1/2001 | Narayanan et al. ........... 429/41 |

OTHER PUBLICATIONS

The Journal of Chemical Society of Japan, (1997), No. 1, p. 69.

* cited by examiner

*Primary Examiner*—Gabrielle Brouillette
*Assistant Examiner*—M. Wills
(74) *Attorney, Agent, or Firm*—Oblon, Spivak, McClelland, Maier & Neustadt, P.C.

(57) ABSTRACT

A solid polymer electrolyte fuel cell includes a solid polymer electrolyte membrane and a fuel cell electrode. The solid polymer electrolyte membrane and/or the fuel cell electrode can contain at least one catalyst selected from oxide catalysts, macrocyclic metal complex catalysts, transition metal alloy catalysts and inorganic salt catalysts. The catalyst decomposes hydrogen peroxide formed during fuel cell operation and prevents the hydrogen peroxide from decomposing the solid polymer electrolyte membrane. As a result, a solid polymer electrolyte fuel cell is formed that is excellent in durability and available at a reduced cost.

14 Claims, 4 Drawing Sheets

SOLID POLYMER ELECTROLYTE FUEL CELL

BACKGROUND OF THE INVENTION

1. Field of the Invention

The present invention relates to a solid polymer electrolyte fuel cell including a solid polymer electrolyte membrane and a fuel cell electrode. In particular, the present invention relates to solid polymer electrolyte fuel cell in which the solid polymer electrolyte membrane and/or the fuel cell electrode contains a catalyst for disproportionating hydrogen peroxide produce during fuel cell operation.

2. Description of the Related Art

To address environmental pollution problems associated with $CO_2$ discharge and global material resource problems associated with dwindling petroleum reserves, fuel cells that are clean, have a high energy density and require no charging time have been proposed. Fuel cell research and development has progressed rapidly in Japan, and throughout the world. In particular, solid polymer electrolyte fuel cells have been developed as electric power sources for vehicles such as automobiles, because these fuel cells exhibit good low-temperature operation and a high power density.

As solid polymer electrolyte membranes for use in fuel cells, perfluorocarbon polymer membranes having sulfonic groups (trade names: Nafion and Aciplex) have generally been used. It has been confirmed that fuel cells with these membranes exhibit satisfactory power generation performance and durability.

However, cost reductions must be realized if fuel cells are to be of practical use. Relatively inexpensive materials for practical fuel cells may include hydrocarbon-based solid polymer electrolyte membranes. However, hydrogen peroxide that forms on an oxidizer electrode of a fuel cell during power generation causes conventional hydrocarbon-based solid polymer electrolyte membranes to decompose. Thus, fuel cells with these membranes exhibit poor durability.

A method of coating a perfluorocarbon polymer solution on the surface of an oxidizer electrode has been proposed in the article "Durability of a Hydrocarbon-based Electrolyte Membrane for Use in Solid Polymer Fuel Cells" contained in *the Journal of Chemical Society of Japan,* issued in 1997 (1997, No. 1, p.69). However, this method can merely delay degradation of the hydrocarbon-based solid polymer electrolyte membrane to some extent and can not prevent degradation of the membrane.

SUMMARY OF THE INVENTION

The present invention provides a solid polymer electrolyte membrane, a fuel cell electrode and a solid polymer electrolyte fuel cell. The solid polymer electrolyte membrane according to the invention is free from degradation, so that the fuel cell has excellent durability and is available at a reduced cost.

The solid polymer electrolyte membrane can include a hydrocarbon-based solid polymer electrolyte membrane supporting at least one catalyst selected from oxide catalysts, macrocyclic metal complex catalysts and transition metal alloy catalysts. Catalyst in and on the solid polymer electrolyte membrane can lower the activation energy for the disproportionation of hydrogen peroxide. As a result, any hydrogen peroxide entering the solid polymer electrolyte membrane can be decomposed by the catalyst, so that the hydrogen peroxide is prevented from decomposing the solid polymer electrolyte membrane.

The fuel cell electrode can join with a hydrocarbon-based solid polymer electrolyte membrane to form part of a joined body of a fuel cell. The fuel cell electrode can support at least one catalyst selected from oxide catalysts, macrocyclic metal complex catalysts, transition metal alloy catalysts and inorganic salt catalysts. The catalyst can lower the activation energy for the disproportionation of hydrogen peroxide. As a result, any hydrogen peroxide evolved at the fuel cell electrode can be decomposed by the catalyst, so that the hydrogen peroxide is prevented from decomposing the hydrocarbon-based solid polymer electrolyte membrane.

The oxide catalyst can be at least one selected from $MnO_2$, $RuO_2$, $ZnO$, $WO_3$, $MnO_2$—$Al_2O_3$, $RuO_2$—$Al_2O_3$, $ZnO$—$Al_2O_3$ and $WO_3$—$Al_2O_3$. The oxide catalyst can have a particularly significant catalytic effect on the disproportionation of hydrogen peroxide.

The macrocyclic metal complex catalyst can be at least one selected from iron phthalocyanine ($C_{32}H_{16}N_8Fe$), copper phthalocyanine ($C_{32}H_{16}N_8Cu$), zinc phthalocyanine ($C_{32}H_{16}N_8Zn$) and cobalt phthalocyanine ($C_{32}H_{16}N_8Co$). The macrocyclic metal complex catalyst can have a particularly significant catalytic effect on the disproportionation of hydrogen peroxide.

The transition metal alloy catalyst can be an alloy of one or more transition metals. Preferably, the transition metal alloy catalyst can be a Cu—Ni alloy. The transition metal alloy catalyst can have a particularly significant catalytic effect on the disproportionation of hydrogen peroxide.

The solid polymer electrolyte membrane can include a sulfonic acid-based resin comprising a copolymer of a fluorocarbon-based vinyl monomer and a hydrocarbon-based vinyl monomer. This material can provide a solid polymer electrolyte membrane, or a joined body of a solid polymer electrolyte membrane and fuel cell electrodes, at a reduced cost.

The solid electrolyte membrane fuel cell can include a fuel electrode and an oxidizer electrode positioned on opposite sides of a hydrocarbon-based solid polymer electrolyte membrane containing at least one catalyst selected from oxide catalysts, macrocyclic metal complex catalysts and transition metal alloy catalyst. Since the hydrocarbon-based solid polymer electrolyte membrane can be prevented from decomposition by hydrogen peroxide, a solid polymer electrolyte fuel cell of excellent durability can be obtained.

The solid electrolyte membrane fuel cell can include a fuel electrode and an oxidizer electrode positioned on opposite sides of a hydrocarbon-based solid polymer electrolyte membrane, where the oxidizer electrode contains at least one catalyst selected from oxide catalysts, macrocyclic metal complex catalysts and transition metal alloy catalysts. Since the oxidizer electrode can prevent the hydrocarbon-based solid polymer electrolyte membrane from being decomposed by hydrogen peroxide, a solid polymer electrolyte fuel cell of excellent durability can be obtained.

DESCRIPTION OF THE PREFERRED EMBODIMENTS

Figure 1:
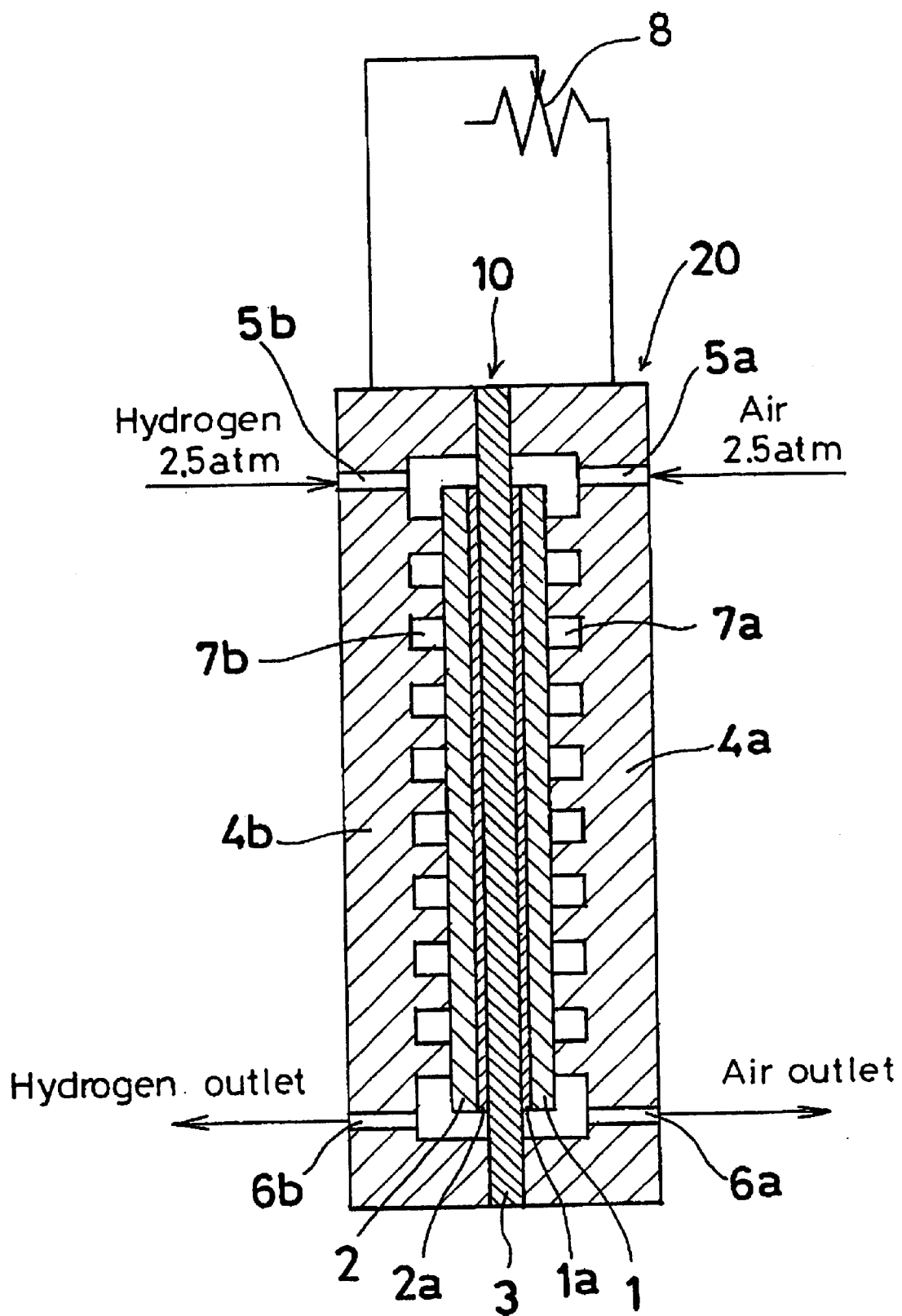
FIG. 1 is a cross sectional view of a single cell, including a joined body of a solid polymer electrolyte membrane and fuel cell electrodes, that is used in the fuel cell endurance tests described in the Examples and the Comparative Example.

In a solid polymer electrolyte fuel cell, a polymer ion exchange membrane is used for the electrolyte and the reaction represented by the formula (1) takes place on a fuel electrode of the fuel cell using hydrogen or a hydrogen-containing reformed gas as a fuel gas.

$$2H_2 \rightarrow 4H^+ + 4e^- \tag{1}$$

$H^+$ formed on the fuel electrode moves through the solid polymer electrolyte membrane toward an oxidizer electrode. Simultaneously, electrons ($e^-$) formed on the fuel electrode move through an external load connected between the fuel electrode and the oxidizer electrode toward the oxidizer electrode.

At the oxidizer electrode, oxygen is reduced by the reaction of the formula (2) and combined with $H^+$ transferring from the fuel electrode into water.

$$O_2 + 4H^+ + 4e^- \rightarrow 2H_2O \tag{2}$$

A portion of the water formed enters into the electrolyte membrane and diffuses toward the fuel electrode, while the other part is evaporated and discharged together with unreacted oxidizer gas.

However, at the oxidizer electrode, 2-electron reducing reactions of oxygen shown by the formulae (3) and (4) proceed simultaneously in addition to 4-electron reaction shown by the formula (2).

$$O_2 + 2H^+ + 2e^- \rightarrow H_2O_2 \tag{3}$$

$$H_2O_2 + 2H^+ + 2e^- 2H_2O \tag{4}$$

Since a large amount of $H_2O$ is formed by the formula (2) on the oxidizer electrode, the reaction of the formula (4) does not proceed significantly. Therefore hydrogen peroxide is formed as a by-product.

The boiling point of hydrogen peroxide is higher than that of water. Thus, the hydrogen peroxide by-product does not evaporate as much as water. Instead, the hydrogen peroxide tends to diffuse under a concentration gradient into the polymer electrolyte membrane. Since hydrogen peroxide is a strong oxidizer, the hydrogen peroxide decomposes the hydrocarbon-based solid polymer electrolyte membrane, leading to a loss of durability of the fuel cell.

As shown by the formula (5), hydrogen peroxide is decomposed into water and oxygen by a disproportionation reaction in which one of two hydrogen peroxide molecules is oxidized and the other is reduced. However, since the activation energy for the reaction of formula (5) is high, the reaction of the formula (5) is extremely slow at the operating temperature of solid polymer electrolyte fuel cells.

$$2H_2O_2 \rightarrow 2H_2O + O_2 \tag{5}$$

According to the present invention, a solid polymer electrolyte membrane and a solid polymer electrolyte fuel cell of excellent durability can be obtained by catalytically decomposing hydrogen peroxide present in the oxidizer electrode or the solid polymer electrolyte membrane of a fuel cell before the hydrogen peroxide decomposes the solid polymer electrolyte membrane. The catalyst lowers the activation energy for hydrogen peroxide disproportionation, enabling the hydrogen peroxide to be decomposed.

In the present invention, the catalyst capable of lowering the activation energy for the disproportionation reaction of the formula (5) (hereinafter referred to as a hydrogen peroxide decomposing catalyst) is added to the solid polymer electrolyte membrane and/or the oxidizer electrode. In embodiments, the catalyst can be added to the fuel electrode.

This catalyst can decompose hydrogen peroxide occurring at the oxidizer electrode in the course of power generation. In addition, the catalyst can decompose hydrogen peroxide intruding into the solid polymer electrolyte membrane. As a result, the catalyst can provide a hydrocarbon-based solid polymer electrolyte membrane free from degradation so that a solid polymer electrolyte fuel cell of excellent durability can be obtained.

The hydrogen peroxide decomposing catalyst includes oxide catalysts, macrocyclic transition metal catalysts, transition metal alloy catalysts, and inorganic salt catalysts.

The oxide catalyst can include, for example, $MnO_2$, $RuO_2$, $ZnO$, $WO_3$, $MgO$, $CaO$, $BaO$, $ZrO_2$, $ThO_2$, $TiO_2$, $MnO_2$—$Al_2O_3$, $RuO_2$—$Al_2O_3$, $ZnO$—$Al_2O_3$, $WO_3$—$Al_2O_3$, $SiO_2$—$Al_2O_3$, $SiO_2$—$MgO$, $SiO_2$—$CaO$, $SiO_2$—$SrO$, $SiO_2$—$BaO$, $MgO$—$Al_2O_3$, $ZnO$—$SiO_2$, $ZnO$—$ZrO_2$, $ThO_2$—$ZrO_2$, $TiO_2$—$ZrO_2$, $Al_2O_3$—$TiO_2$, $SiO_2$—$ZrO_2$, $Al_2O_3$—$ZrO_2$, $SiO_2$—$TiO_2$, $MoO_3$—$SiO_2$, $MoO_3$—$Al_2O_3$, $WO_3$—$SiO_2$ and $SiO_2$—$CaO$—$MgO$. The oxide catalysts $MnO_2$, $RuO_2$, $ZnO$, $WO_3$, $MnO_2$—$Al_2O_3$, $RuO_2$—$Al_2O_3$, $ZnO$—$Al_2O_3$, and $WO_3$—$Al_2O_3$ have particularly remarkable effects.

The oxide catalyst can decompose hydrogen peroxide by oxidation/reduction of oxygen in the oxide or oxygen adsorbed on the surface of the oxide. For example, $MnO_2$ decomposes hydrogen peroxide by the reactions shown by the formulae (6) and (7).

$$2MnO_2 + H_2O_2 \rightarrow O_2 + Mn_2O_3 + H_2O \tag{6}$$

$$Mn_2O_3 + H_2O_2 \rightarrow 2MnO_2 + H_2O \tag{7}$$

The macrocyclic transition metal catalyst can decompose hydrogen peroxide by the effect of adsorption/reduction of the transition metal with hydrogen peroxide. For example, iron phthalocyanine ($C_{32}H_{16}N_8Fe$) decomposes hydrogen peroxide by the reactions shown by the formulae (8) and (9).

$$2C_{32}H_{16}N_8Fe + H_2O_2 \rightarrow C_{32}H_{16}N_8Fe\text{—HOHO—}FeN_8H_{16}C_{32} \tag{8}$$

$$C_{32}H_{16}N_8Fe\text{—HOHO—}FeN_8N_{16}C_{32} \rightarrow 2C_{32}H_{16}N_8Fe + 2H_2O + O_2 \tag{9}$$

The transition metal alloy catalyst can decompose hydrogen peroxide by the reactions shown by the formulae (10) and (11).

$$M + H_2O_2 \rightarrow M.H_2O_2 \tag{10}$$

$$2M.H_2O_2 \rightarrow 2M + 2H_2O + O_2 \tag{11}$$

(In the formulae, M represents a transition metal.) The transition metal alloy catalyst can include transition metals such as Ti, V, Cr, Mn, Fe, Co, Ni, Cu, Zn, Zr, Nb, Mo, Ru, Rh, Pd, Ta, W, Re, Ir and Pt.

One or more of the oxide catalysts, macrocyclic transition metal catalysts and transition metal alloy catalysts can be added simultaneously to the solid polymer electrolyte membrane or to the fuel cell electrode.

There is no particular restriction on the amount of the oxide catalyst, macrocyclic transition metal catalyst and the transition metal alloy catalyst that can be added to the solid polymer electrolyte membrane. Preferably, the total amount of the catalysts added to the solid polymer electrolyte membrane is from 0.1 to 30 parts by weight based on 100 parts by weight of the solid polymer electrolyte membrane.

Further, there is no particular restriction on the amount of the oxide catalyst, the macrocyclic transition metal catalyst and the transition metal alloy catalyst that can be added to the fuel cell electrode. Preferably, the weight ratio between the fuel cell electrode and the total amount of the catalysts added to the fuel cell electrode is within a range from 99:1 to 50:50.

EXAMPLES

The following examples further illustrate the invention.

Example 1

Manganese dioxide having a specific surface area of about 60 $m^2/g$ is mixed in an amount of 10% by weight with melted ethylene-tetrafluoroethylene copolymer, and extruded to obtain a membrane of 50 $\mu$m thickness. After washing the membrane with acetone, the membrane is irradiated with γ-rays at 5 KGeV using cobalt 60 as a radiation source.

After charging 10 $cm^2$ of the thus obtained membrane into a reaction tube made of glass, 25 ml of styrene is added, and the inside of the reaction tube is thoroughly replaced with nitrogen. Subsequently, the reaction tube is immersed in a thermostable bath at 60° C. for 19 hours to react the membrane with the styrene.

After the reaction, the membrane is washed with benzene three times, and then dried by using a drying machine. The membrane after drying is immersed in a liquid mixture comprising 30 parts by weight of chlorosulfonic acid and 70 parts by weight of 1,1,2,2-tetrachloroethane at room temperature for 30 minutes and then washed with 1,1,2,2-tetrachloroethane.

Further, the membrane is washed with ion exchanged water, immersed in an aqueous 2N potassium hydroxide solution at 100° C. for 30 minutes, then immersed in a 1N sulfuric acid solution at 100° C. for 30 minutes and then sufficiently washed with ion exchanged water to obtain a solid polymer electrolyte membrane.

The membrane is evaluated by a hydrogen peroxide decomposition test and a fuel cell duration test.

In the hydrogen peroxide decomposition test, the thus prepared solid polymer electrolyte membrane is immersed in an aqueous hydrogen peroxide at a concentration of $1\times10^{-3}$ mol/l at 80° C., and the change of weight is measured. Evaluation is conducted for 10 hours. The concentration of the aqueous hydrogen peroxide is about 100 times as high as the estimated concentration of hydrogen peroxide evolving at an oxidizer electrode of a fuel cell, which provides an acceleration test.

The fuel cell duration test is conducted for a joined body of the thus prepared solid polymer electrolyte membrane and fuel cellelectrodes. The joined body is prepared by charging the thus prepared solid polymer electrolyte membrane between the fuel cell electrodes described below, set to a hot press machine and subjected to hot pressing at 100° C. under 20 $kg/cm^2$ for 5 minutes and then at 130° C. under 20 $kg/cm^2$ for 5 minutes, further, at 165° C. under 20 $kg/cm^2$ for 5 minutes and then to further hot pressing while increasing the pressure to 80 $kg/cm^2$ for 90 seconds.

The fuel cell electrode is prepared by the following method.

A dispersion stock solution containing polytetrafluoroethylene (hereinafter referred as PTFE) at a concentration of 60% manufactured by Daikin Industries, Ltd. (a tradename: POLYFLON, D1 grade) is diluted with water to a concentration of the PTFE content of 15 wt % to prepare a PTFE treating solution.

A carbon paper manufactured by Toray Industries, Inc. (a trade name: Torayca TGP-060, 180 $\mu$m thickness) is placed in the PTFE treating solution and thoroughly impregnated with the PTFE treating solution. Then, after evaporating an excess water content in a drying furnace kept at a temperature of 80° C., it is kept at a sintering temperature of 390° C. for 60 minutes to sinter PTFE, thereby preparing a water-repellent carbon paper.

Subsequently, a platinum-on-carbon catalyst at a 40% platinum concentration is thoroughly mixed with an ion exchange resin solution, water and isopropyl alcohol, to prepare a catalyst paste.

After coating the catalyst paste by a doctor blade method to a thickness of 300 $\mu$m on one surface of the water-repellent carbon paper, it is dried, and the isopropyl alcohol is removed to prepare an oxidizer electrode.

FIG. 1 is a cross sectional view of a single cell having a joined body of a solid polymer electrolyte membrane and fuel cell electrodes used for a fuel cell endurance test.

In a joined body 10 of a solid polymer electrolyte membrane and a fuel cell electrode, a solid polymer electrolyte membrane 3 is put between and joined with an oxidizer electrode 1 and a fuel electrode 2, in which an oxidizer electrode catalyst layer 1a and a fuel electrode catalyst layer 2a are in contact with the surfaces of the solid polymer electrolyte membrane 3, respectively. The joined body 10 is put between a separator 4a having an air inlet 5a, an air flow channel 7a and an air outlet 6a, and a separator 4b having a hydrogen inlet 5b, a hydrogen flow channel 7b and a hydrogen outlet 6b, to form a single cell 20.

Air at 2.5 atm is supplied from the air supply port 5a through the air flow channel 7a to the oxidizer electrode 1 (utilization factor: 40%) and hydrogen at 2.5 atm is supplied from the hydrogen inlet 5b through the hydrogen flow channel 7b to a fuel electrode 2 (utilization factor: 80%). The cell temperature is at 70° C., and humidification is conducted by supplying steams together with air and hydrogen by a bubbling method.

A generated electric current is taken out of electric terminals of the separator 4a and the separator 4b, and a single cell voltage of the single cell 20 is measured at a current density of 0.5 A/$cm^2$ while varying the resistance by an external variable resistor 8. Measurement is conducted for 3,000 hours to evaluate the durability.

Example 2

Iron phthalocyanine having a specific surface area of about 100 $m^2/g$ is mixed in an amount of 10% by weight with melted ethylene-tetrafluoroethylene copolymer, and extruded to obtain a membrane of 50 $\mu$m thickness. In the subsequent procedures, the same treatment as in Example 1 is conducted to form a solid polymer electrolyte membrane to which iron phthalocyanine is added as a macrocyclic transition metal catalyst.

The membrane is evaluated by a hydrogen peroxide decomposition test and a fuel cell duration test in the same manners as in Example 1.

Example 3

Cu—Ni alloy particles having a specific surface area of about 80 $m^2/g$ are mixed in an amount of 10% by weight with melted ethylene-tetrafluoroethylene copolymer, and extruded to obtain a membrane of 50 μm thickness. In the subsequent procedures, the same treatment as in Example 1 is conducted to form a solid polymer electrolyte membrane to which Cu—Ni alloy is added as a transition metal alloy catalyst to form a solid polymer electrolyte membrane.

The membrane is evaluated by a hydrogen peroxide decomposition test and a fuel cell duration test in the same manners as in Example 1.

Comparative Example

An ethylene-tetrafluoroethylene copolymer is extruded to form a membrane of 50 μm thickness. In the subsequent procedures, the same treatment as in Example 1 is conducted to form a solid polymer electrolyte membrane to which no catalyst was added.

The membrane is evaluated by a hydrogen peroxide decomposition test and a fuel cell duration test in the same manners as in Example 1.

Result of Evaluation

Figure 2:
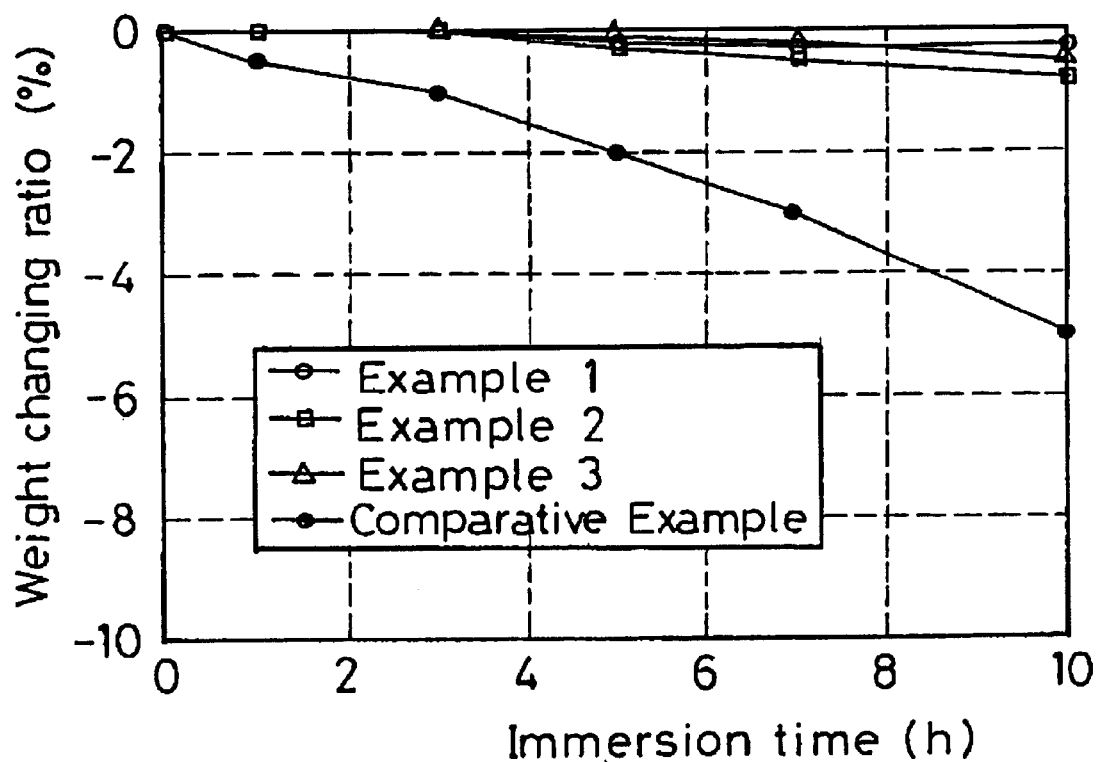
FIG. 2 is a graph showing the results of a hydrogen peroxide decomposition test for Examples 1 to 3 and the Comparative Example.

FIG. 2 is a graph for the result of the hydrogen peroxide decomposition test for Examples 1 to 3 and Comparative Example.

In the graph, the abscissa indicates an immersion time in which the solid polymer electrolyte membrane was immersed in an aqueous hydrogen peroxide solution, and the ordinate indicates the weight changing ratio of the solid polymer electrolyte membrane.

The Comparative Example shows a large weight changing ratio, and the solid polymer electrolyte membrane is decomposed with hydrogen peroxide. Each of Examples 1 to 3 shows a small weight changing ratio in which the decomposition of the solid polymer electrolyte membrane is prevented.

Figure 3:
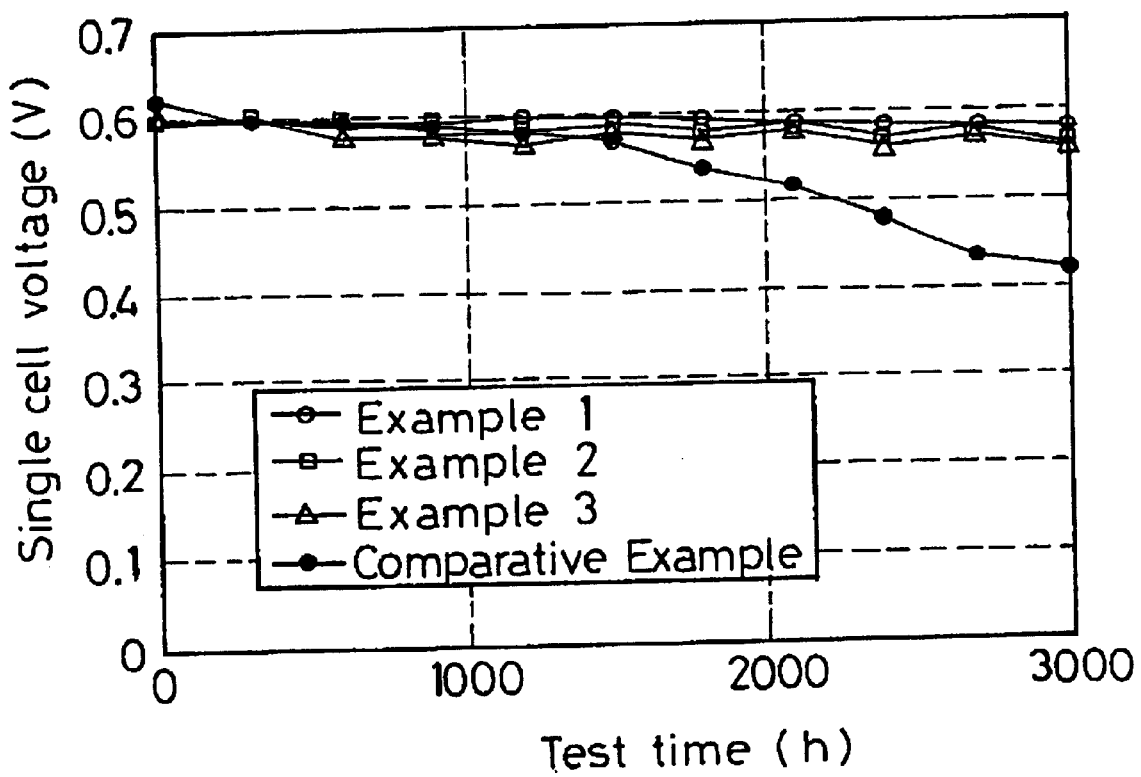
FIG. 3 is a graph showing the results of a fuel cell endurance test for Examples 1 to 3 and the Comparative Example.

FIG. 3 is a graph for the result of a fuel cell endurance test for Examples 1 to 3 and Comparative Example.

In the graph, the abscissa shows a test time for the fuel cell endurance test and the ordinate indicates a single cell voltage. In the Comparative Example, no significant drop of the single cell voltage is observed up to 1,500 hours, but the voltage lowered abruptly after 1,500 hours. On the other hand, the single cell voltage drop is scarcely observed for Examples 1 to 3 even at 3,000 hours.

From the result described above, it is found that the solid polymer electrolyte membranes of Examples 1 to 3 are scarcely decomposed by hydrogen peroxide and are excellent in durability compared with the Comparative Example.

Example 4

A dispersion stock solution containing tetrafluoroethylene (hereinafter referred as PTFE) at a concentration of 60% manufactured by Daikin Industries, Ltd. (a trade name: POLYFLON, D1 grade) is diluted with water to a concentration of the PTFE content of 15 wt % to prepare a PTFE treating solution.

Carbon paper manufactured by Toray Industries, Inc. (a trade name: Torayca TGP-060, 180 μm thickness) is placed in the PTFE treating solution and thoroughly impregnated with the PTFE treating solution. Then, after evaporating an excess water content in a drying furnace kept at a temperature of 80° C., it is kept at a sintering temperature of 390° C. for 60 minutes to sinter PTFE, thereby preparing a water-repellent carbon paper.

Subsequently, a platinum-on-carbon catalyst at a 40% platinum concentration and $MnO_2$ powder having a specific surface area of about 60 $m^2$/g are weighed at a weight ratio of 7:3 and thoroughly mixed with an ion exchange resin solution, water and isopropyl alcohol, to prepare a catalyst paste.

After coating the catalyst paste by a doctor blade method to a thickness of 300 μm on one surface of the water-repellent carbon paper, it is dried, and the isopropyl alcohol is removed to prepare an oxidizer electrode.

On the other hand, the fuel electrode is prepared by the same manner as that for the oxidizer electrode but with no incorporation of the $MnO_2$ powder.

The fuel cell is evaluated by the same fuel cell duration test as in Example 1.

The solid polymer electrolyte membrane used for the evaluation in the fuel cell endurance test is prepared in the same manner as that for the Comparative Example.

Example 5

An oxidizer electrode in Example 5 is prepared in the same manner as in Example 4 except for using iron phthalocyanine having a specific surface area of about 100 $m^2$/g instead of the $MnO_2$ powder. Addition amount of iron phthalocyanine is at a 5:5 weight ratio for the platinum-on-carbon catalyst at a 40% platinum concentration and the iron phthalocyanine.

The fuel electrode and the solid polymer electrolyte membrane quite identical with those in Example 4 are used. The evaluation is conducted also by the same manner as in Example 4.

Example 6

An oxidizer electrode in Example 5 is prepared in the same manner as in Example 4 except for using a Cu—Ni alloy powder (atomic ratio of Cu and Ni: 8:2) having a specific surface area of about 80 $cm^2$/g instead of the $MnO_2$ powder. Addition amount of the CuNi alloy powder is at a 7:3 weight ratio for the platinum-on-carbon catalyst at a 40% platinum concentration and the CuNi alloy powder.

The fuel electrode and the solid polymer electrolyte membrane quite identical with those in Example 4 are used. The evaluation is conducted also by the same manner as in Example 4.

Figure 4:
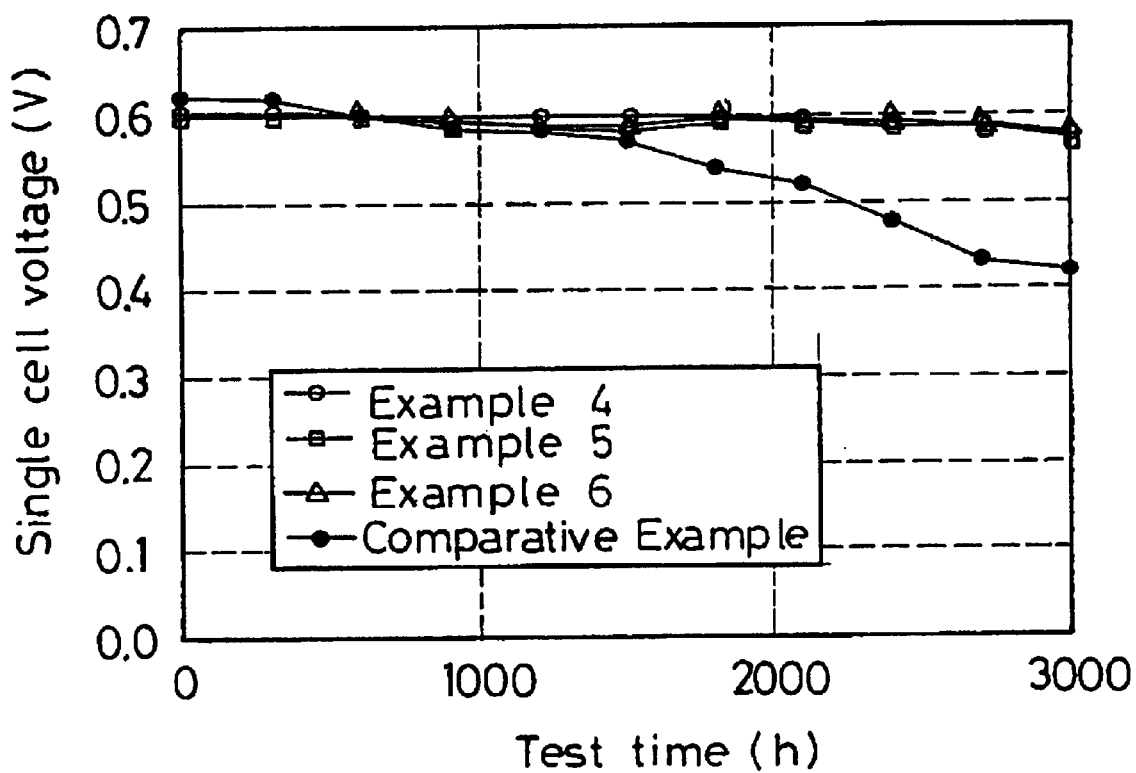
FIG. 4 is a graph showing the results of a fuel cell endurance test for Examples 4 to 6 and the Comparative Example.

FIG. 4 is a graph for the result of a fuel cell endurance test for Examples 4 to 6 and Comparative Example. The Comparative Example used in this test is identical with the Comparative Example for the solid polymer electrolyte membrane.

In the graph, the abscissa shows a test time for the fuel cell endurance test and the ordinate indicates a single cell voltage. In the Comparative Example, no significant drop of the single cell voltage is observed up to 1,500 hours, but the voltage lowers abruptly after 1, 500 hours. On the other hand, the single cell voltage drop is scarcely observed even at 3,000 hours in Examples 4 to 6.

From the foregoing results, since decomposition of the solid polymer electrolyte membrane with hydrogen peroxide can be prevented by the use of the electrodes for use in the fuel cell of the Examples 1 to 6, it can be seen that a solid polymer electrolyte fuel cell of excellent durability can be obtained.

As described above, according to the present invention, at least one catalyst selected from oxide catalysts, macrocyclic metal complex catalysts and transition metal alloy catalysts can be added to a hydrocarbon-based solid polymer electrolyte membrane. In addition, at least one catalyst selected from oxide catalysts, macrocyclic metal complex catalysts, transition metal alloy catalysts and inorganic salt catalysts can be added to a fuel cell electrode which joins with a hydrocarbon-based polymer electrolyte membrane to constitute a joined body of a solid polymer electrolyte membrane. As a result, a solid polymer electrolyte fuel cell of excellent durability can be obtained at a reduced cost.

While the present invention has been described with reference to specific embodiments, it is not confined to the specific details set forth, but is intended to convey such modifications or changes as may come within the skill in the art.

The contents of Japanese Patent Application No. 10-278397, which was filed in Japan on Sep. 30, 1998, is incorporated by reference herein in its entirety.

What is claimed is:

1. A solid polymer electrolyte membrane comprising a hydrocarbon-based solid polymer electrolyte membrane supporting at least one catalyst selected from the group consisting of oxide catalysts and macrocyclic metal complex catalysts, wherein the oxide catalysts are selected from the group consisting of $MnO_2$, $ZnO$, $MnO_2$—$Al_2O_3$, $RuO_2$—$Al_2O_3$, $ZnO$—$Al_2O_3$ and $WO_3$—$Al_2O_3$; and the hydrocarbon-based solid polymer electrolyte membrane comprises a sulfonic acid-based resin of a copolymer of a fluorocarbon-based vinyl monomer and a hydrocarbon-based vinyl monomer.

2. The solid polymer electrolyte membrane according to claim 1, wherein the macrocyclic metal complex catalysts comprise at least one selected from the group consisting of iron phthalocyanine ($C_{32}H_{16}N_8Fe$), copper phthalocyanine ($C_{32}H_{16}N_8Cu$), zinc phthalocyanine ($C_{32}H_{16}N_8Zn$) and cobalt phthalocyanine ($C_{32}H_{16}N_8Co$).

3. A solid polymer electrolyte membrane comprising a hydrocarbon-based solid polymer electrolyte membrane supporting at least one transition metal alloy catalyst, wherein the at least one transition metal alloy catalyst comprises a Cu—Ni alloy.

4. A solid polymer electrolyte fuel cell comprising a fuel electrode, an oxidizer electrode, and a hydrocarbon-based solid polymer electrolyte membrane between the fuel electrode and the oxidizer electrode, wherein the oxidizer electrode supports at least one catalyst selected from the group consisting of oxide catalysts, macrocyclic metal complex catalysts, transition metal alloy catalysts and inorganic salt catalysts;

the oxide catalysts are selected from the group consisting of $MnO_2$, $ZnO$, $MnO_2$—$Al_2O_3$, $RuO_2$—$Al_2O_3$, $ZnO$—$Al_2O_3$ and $WO_3$—$Al_2O_3$; and each of the transition metal alloy catalysts comprises a Cu—Ni alloy.

5. The fuel cell according to claim 4, wherein the macrocyclic metal complex catalysts comprise at least one selected from the group consisting of iron phthalocyanine ($C_{32}H_{16}N_8Fe$), copper phthalocyanine ($C_{32}H_{16}N_8Cu$), zinc phthalocyanine ($C_{32}H_{16}N_8Zn$) and cobalt phthalocyanine ($C_{32}H_{16}N_8Co$).

6. The fuel cell according to claim 4, wherein the hydrocarbon-based solid polymer electrolyte membrane comprises a sulfonic acid-based resin of a copolymer of a fluorocarbon-based vinyl monomer and a hydrocarbon-based vinyl monomer.

7. A solid polymer electrolyte fuel cell comprising a fuel electrode, an oxidizer electrode, and the hydrocarbon-based solid polymer electrolyte membrane of claim 1 between the fuel electrode and the oxidizer electrode.

8. A method of forming a solid polymer electrolyte membrane, the method comprising mixing a catalyst with a polymer, and forming the solid polymer electrolyte membrane of claim 1.

9. A method of forming a fuel cell, the method comprising depositing a catalyst on an oxidizer electrode, and forming the fuel cell of claim 4.

10. A method of forming a solid polymer electrolyte fuel cell, the method comprising joining a solid polymer electrolyte membrane and a fuel cell electrode, and forming the solid polymer electrolyte fuel cell of claim 7.

11. A method of using a solid polymer electrolyte membrane, the method comprising generating electricity with a fuel cell including the solid polymer electrolyte membrane of claim 1.

12. A method of using a fuel cell, the method comprising generating electricity with the fuel cell of claim 4.

13. A method of using a solid polymer electrolyte fuel cell, the method comprising generating electricity with the solid polymer electrolyte fuel cell of claim 7.

14. A solid polymer electrolyte fuel cell comprising a fuel electrode, an oxidizer electrode, and the hydrocarbon-based solid polymer electrolyte membrane of claim 3 between the fuel electrode and the oxidizer electrode.

* * * * *